No. 625,041. Patented May 16, 1899.
L. H. & H. S. LANDIS.
TREE BALLING AND TRANSFERRING DEVICE.
(Application filed Nov. 28, 1898.)

(No Model.)

Witnesses,

Inventors
Leonidas H. Landis
Harry S. Landis
By Dewey Strong & Co.
Attys

THE NORRIS PETERS CO., PHOTO-LITHO., WASHINGTON, D. C.

UNITED STATES PATENT OFFICE.

LEONIDAS H. LANDIS AND HARRY S. LANDIS, OF ORANGEVALE, CALIFORNIA.

TREE BALLING AND TRANSFERRING DEVICE.

SPECIFICATION forming part of Letters Patent No. 625,041, dated May 16, 1899.

Application filed November 28, 1898. Serial No. 697,727. (No model.)

*To all whom it may concern:*

Be it known that we, LEONIDAS H. LANDIS and HARRY S. LANDIS, citizens of the United States, residing at Orangevale, county of Sacramento, State of California, have invented an Improvement in Tree Balling and Transplanting Devices; and we hereby declare the following to be a full, clear, and exact description of the same.

Our invention relates to a device for performing the operation technically known as "balling" in the transportation of trees and shrubs.

It consists, essentially, of a sheet-metal cylinder having the meeting edges disengageably connected, a means for placing the cylinder around a tree or shrub to be removed and forcing its sharp lower edge into the soil around the roots of the tree, and a bottom adapted to be slipped in beneath the cylinder and inclosed tree-roots, with means for securing it to the cylinder, so that the whole device, with the inclosed tree, may be lifted from the hole and removed to some other point without disturbing the roots or interfering with the growth of the tree.

The invention also comprises details of construction, which will be more fully explained by reference to the accompanying drawings, in which—

Figure 1:
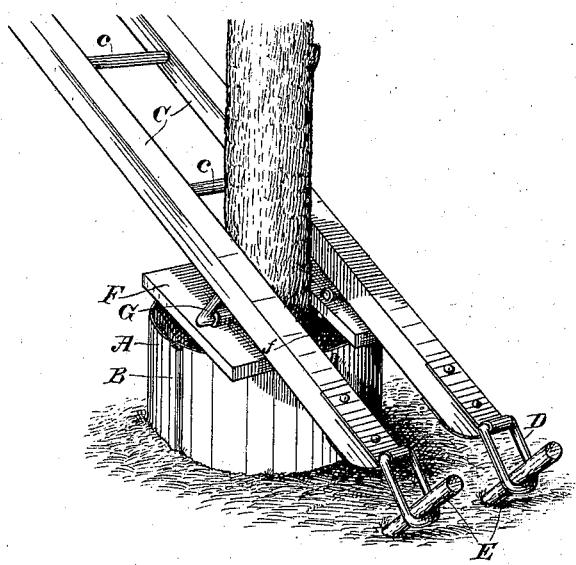
Figure 2:
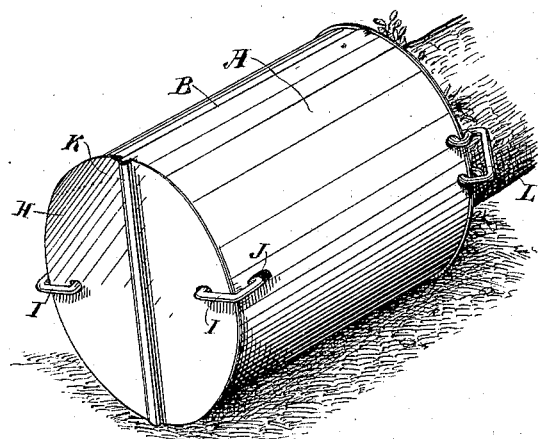

Figure 1 shows the cylinder being pressed down. Fig. 2 shows the tree with its ball cased in and ready for transporting.

In the transplanting of trees and shrubs there is considerable difficulty in retaining a sufficient body of the earth in which the tree originally grew upon the roots, and when this is not done the growth of the tree is very materially retarded by transplanting it.

The object of our invention is to remove young trees and shrubs from the nursery to points where they are to be permanently located with little or no disturbance to the roots and the earth thereabout, so that the growth will not be checked.

In carrying out the invention we employ a cylinder A of sheet metal of sufficient weight and stiffness. The meeting edges upon one side of the cylinder are bent or folded so as to form interlocking hook-shaped edges B. When the device is to be used, these edges are separated sufficiently to pass the cylinder about the stem of the tree or shrub, after which they are closed and interlocked, so as to form a complete cylinder. This being placed so that the tree is approximately central within it, the cylinder is forced down into the ground, cutting out a body of earth equal to its inner diameter.

In order to properly force the cylinder down, we have shown a device comprising lever-arms C, having links D loosely attached at one end. The two arms C are separated sufficiently to pass on each side of the tree-trunk, and the links are adapted to be held in position by diagonally-driven stakes E, with which they engage. At a point which will stand essentially above the cylinder A is a plate F, connected by links G with the lever-arms C, so that the plate is freely movable about its connection with the links. This plate is slotted inwardly from one end, as shown at $f$, so that this slot also passes around the body of the tree, and the links then stand approximately in line with the tree-body, the plate resting upon the top of the cylinder. The rearwardly-extending arms of the levers C may be connected, as shown, by cross-bars $c$, so that they act in unison, and are made of sufficient length to produce the proper leverage, so that when pressure is brought upon these ends the cylinder will be forced into the ground to the whole or any part of its depth. The flexible connection of the plate F allows it to conform to the top of the cylinder and the varying angles taken by the lever-arms during the operation. When the cylinder has thus been sunk around the tree, the lever and its plate F are removed, and by digging around the cylinder until the lower part is exposed the cylinder may be tilted a little to one side, breaking away the body of earth within the cylinder from that below and allowing any tap-roots extending below this point to be cut off. The bottom H is then slipped beneath the cylinder and is attached to it by means of hooks, links, or other devices, as shown at I. These may be suitably bent and hooked into holes J in the sides of the cylinder, or the connection may be made in any suitable manner. In order to make this bottom sufficiently rigid without too much weight, it has grooves or corrugations K formed across it by pressure or otherwise, and these bend the metal into such form as to give it greater resistance to pressure, and thus prevent the bottom being sprung out of shape by the weight within the cylinder. The bottom being thus applied, the cylinder can be lifted with the "ball" (so called) of earth around the roots of the tree and the whole transported to any desired point.

For convenience in lifting and moving the device handles L are shown fixed to the upper edges of the cylinder. These handles, as here shown, are bent from wire and loops formed at opposite ends, which can be inserted through corresponding holes made in the upper edge of the cylinder, the loops and handles being easily removable and replaceable at will.

After the first tree or plant has been removed, as nursery stock grows very closely together, the necessary space at the side of the cylinder for loosening and applying the bottom is easily made.

These devices may be sent out with the trees to the purchaser, who transplants the trees without disturbing the earth, removing the cylinders and returning them to the nurserymen for further use.

If desired, after the trees have been raised the cylinders may be removed from the ball and tree, and they can be inclosed in lighter cylinders or cylinders of different material which will be sufficient to hold the earth together during the process of removal.

Having thus described our invention, what we claim as new, and desire to secure by Letters Patent, is—

1. A transplanting device comprising an open-sided cylinder having means for engaging and locking the edges after it has been placed about the tree, means including a fulcrumed lever for forcing the cylinder into the earth to inclose the tree-roots in a body of earth, and a bottom applicable thereto to retain the mass in position.

2. A transplanting device consisting of a cylinder having meeting edges formed with interlocking hooks whereby it may be passed about the body of the tree and afterward closed and secured, means for forcing the cylinder into the earth about the tree-roots, a bottom having corrugations formed across it, said bottom being adapted to slide beneath the bottom of the cylinder, and devices by which it can be afterward attached to the cylinder.

3. A transplanting device consisting of a cylinder having the meeting edges separable and provided with interlocking hooks, a lever comprising arms separated to pass about the body of the tree with links for fulcrum attachments at one end, a slotted plate adapted to fit around the body of the tree and rest upon the top of the cylinder and links connecting the plate with the lever-arms.

4. A transplanting device consisting of a cylinder having the meeting edges separable and formed with interlocking hooks, a lever and flexible plate and fulcrum connection whereby the cylinder may be forced into the ground about the tree, a bottom having transverse stiffening-corrugations, said bottom being adapted to slip beneath the bottom of the cylinder and links by which it is connected with the cylinder to retain the earth in place therein.

In witness whereof we have hereunto set our hands.

LEONIDAS H. LANDIS.
HARRY S. LANDIS.

Witnesses:
GEO. IMHOFF,
ISAAC HYMAN.